US012202538B2

United States Patent
Zarpelon et al.

(10) Patent No.: US 12,202,538 B2
(45) Date of Patent: Jan. 21, 2025

(54) CHASSIS CROSSMEMBER WITH BATTERY SUPPORT

(71) Applicant: Volvo Truck Corporation, Gothenburg (SE)

(72) Inventors: Fernando Luis Zarpelon, Curitiba (BR); Gilberto Schorr Grossl, Curitiba (BR); Eduardo Zonatto, Curitiba (BR); Jones George Kiatcoski Gioppo, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/017,715

(22) PCT Filed: Oct. 16, 2020

(86) PCT No.: PCT/BR2020/050419
§ 371 (c)(1),
(2) Date: Jan. 24, 2023

(87) PCT Pub. No.: WO2022/077080
PCT Pub. Date: Apr. 21, 2022

(65) Prior Publication Data
US 2024/0253700 A1    Aug. 1, 2024

(51) Int. Cl.
*B60R 16/04* (2006.01)
*B62D 21/03* (2006.01)

(52) U.S. Cl.
CPC ............. *B62D 21/03* (2013.01); *B60R 16/04* (2013.01)

(58) Field of Classification Search
CPC ........ B62D 21/03; B62D 21/02; B60R 16/04; B60K 1/04
See application file for complete search history.

(56) References Cited

U.S. PATENT DOCUMENTS

| 11,358,479 B2 * | 6/2022 | Breu ............... A01B 76/00 |
| 2006/0096794 A1 | 5/2006 | Yoshida |

(Continued)

FOREIGN PATENT DOCUMENTS

| CN | 105644639 A | * | 6/2016 | ............... B60K 1/04 |
| CN | 207190976 U | | 4/2018 | |

(Continued)

OTHER PUBLICATIONS

Zhang et al. CN 212073946, Machine English Translation, ip.com (Year: 2020).*

(Continued)

*Primary Examiner* — Karen Beck
(74) *Attorney, Agent, or Firm* — Withrow & Terranova, PLLC (57) ABSTRACT

Aspects of the disclosure relate to chassis crossmember with a battery support. In certain embodiments, the chassis crossmember includes a battery support configured to mount at least one vehicle battery to and increase a stiffness of a chassis of a vehicle. The battery support includes a battery tray, including a floor, a front sidewall, and a rear sidewall. The battery tray is configured to extend between a left rail and a right rail of the chassis. The chassis crossmember further includes at least one left mounting bracket configured to rigidly mount a left side of the battery support to a left inner surface of the left rail of the chassis. The chassis crossmember further includes at least one right mounting bracket configured to rigidly mount a right side of the battery support to a right inner surface of the right rail of the chassis.

18 Claims, 10 Drawing Sheets

(56) References Cited

U.S. PATENT DOCUMENTS

| | | | | |
|---|---|---|---|---|
| 2008/0231034 A1* | 9/2008 | Carr | ............... | B62D 21/02 |
| | | | | 280/789 |
| 2009/0000843 A1* | 1/2009 | Burchett | ............... | B60R 16/04 |
| | | | | 180/68.5 |
| 2013/0248263 A1* | 9/2013 | Umetani | ............... | B60L 50/64 |
| | | | | 180/65.1 |
| 2015/0089981 A1 | 4/2015 | Renfro et al. | | |
| 2020/0369140 A1* | 11/2020 | McCarron | ............ | B62D 21/152 |
| 2022/0097537 A1* | 3/2022 | Prothery | ............ | H01M 50/209 |

FOREIGN PATENT DOCUMENTS

| | | | | |
|---|---|---|---|---|
| CN | 108725358 | A | | 11/2018 |
| CN | 208180971 | U | | 12/2018 |
| CN | 208393291 | U | | 1/2019 |
| CN | 210478604 | U | | 5/2020 |
| CN | 211731289 | U | | 10/2020 |
| CN | 212073946 | U | * | 12/2020 |
| DE | 102011012447 | A1 | * | 9/2011 ............... B60K 1/04 |
| DE | 102016113759 | A1 | | 4/2017 |
| DE | 102019103353 | A1 | * | 8/2020 |
| EP | 1334881 | A2 | | 8/2003 |
| EP | 2712788 | A2 | | 4/2014 |
| WO | 2013112397 | A1 | | 8/2013 |
| WO | 2020160747 | A1 | | 8/2020 |

OTHER PUBLICATIONS

Gehringhoff et al. DE 10 2019 103353, Machine English Translation, ip.com (Year: 2020).*

Li et al. CN 105644639, Machine English Translation, ip.com (Year: 2016).*

Zachnegger et al. DE10 2011 012447, Machine English Translation, ip.com (Year: 2011).*

International Search Report and Written Opinion for International Patent Application No. PCT/BR2020/050419, mailed Mar. 24, 2021, 10 pages.

Extended European Search Report for European Patent Application No. 20956907.8, mailed Jun. 18, 2024, 7 pages.

* cited by examiner

CHASSIS CROSSMEMBER WITH BATTERY SUPPORT

This application is a 35 USC 371 national phase filing of International Application No. PCT/BR2020/050419, filed Oct. 16, 2020, the disclosure of which is incorporated herein by reference in its entirety.

FIELD OF THE DISCLOSURE

The disclosure relates generally to a chassis crossmember. In particular aspects, the disclosure relates to a vehicle and a chassis crossmember with a battery support to mount a battery and increase a stiffness of a chassis of a vehicle.

BACKGROUND

Figure 1:
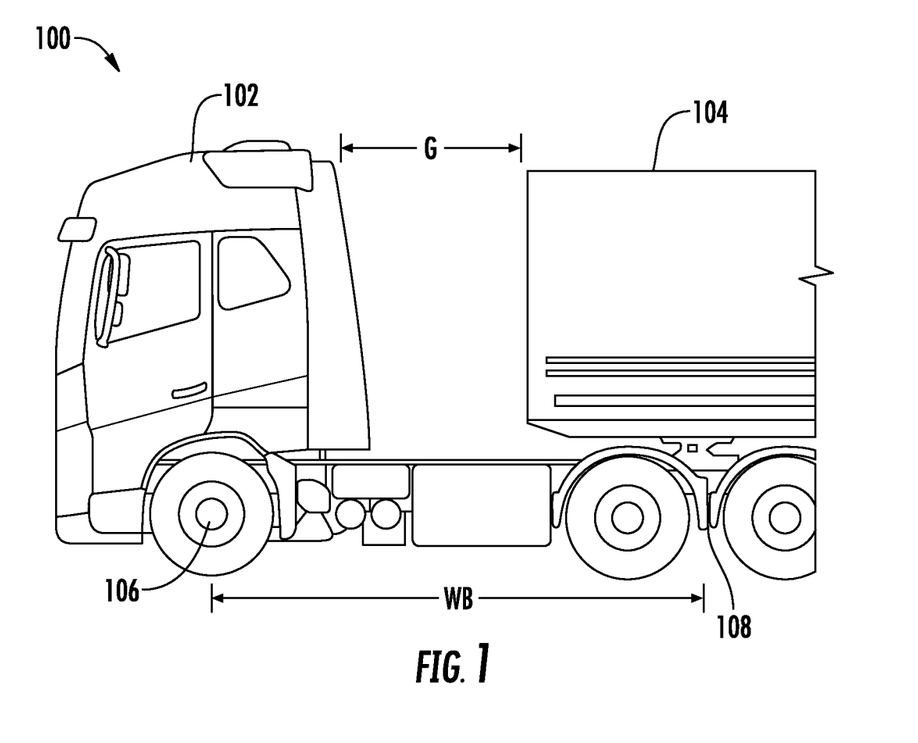
FIG. 1 is a side view of a truck illustrating a gap between a cab and trailer of the truck.

Certain jurisdictions (e.g., Brazil, Europe, etc.) limit truck loads and dimensions, such as front axle load and/or total truck length. As a result, many truck designs in such jurisdictions include a large gap between the cab and the trailer. For example, FIG. 1 illustrates a truck 100 with a gap G between the cab 102 and the trailer 104. The gap G is defined in part by a wheelbase WB between the front axle 106 and the center of a rear axle hub 108. This gap G increases drag force, which decreases fuel efficiency. Accordingly, reducing this gap G (e.g., by 500 mm) would significantly reduce fuel consumption and associated costs. One way to reduce the gap G between the cab 102 and the trailer 104 is to reduce the wheelbase WB between the front axle 106 and the center of rear axle hub 108. However, any such reduction requires a reconfiguration of truck components, preferably without reducing fuel capacity (by reducing the size of the fuel tank).

SUMMARY

According to an aspect of the disclosure, a chassis crossmember includes a battery support configured to mount at least one vehicle battery to and increase a stiffness of a chassis of a vehicle. The battery support consists of a battery tray, including a floor, a front sidewall, and a rear sidewall. The battery tray is configured to extend between a left rail and a right rail of the chassis. The chassis crossmember further includes at least one left mounting bracket configured to rigidly mount a left side of the battery support to a left inner surface of the left rail of the chassis. The chassis crossmember further includes at least one right mounting bracket configured to rigidly mount a right side of the battery support to a right inner surface of the right rail of the chassis.

In certain embodiments, the battery support further includes side plates extending between the front sidewall and the rear sidewall.

In certain embodiments, at least one of the side plates includes a cable aperture to route a cable from an interior to an exterior of the battery support.

In certain embodiments, each of the side plates comprises a plurality of flanges that at least partially overlap to reinforce corners of the side plates.

In certain embodiments, the battery support further comprises a drainage hole in each bottom corner of the battery support.

In certain embodiments, the battery support further comprises a steppable cover removably attached to the battery tray.

In certain embodiments, the battery support is configured to support two vehicle batteries.

In certain embodiments, a height of the chassis crossmember is less than a height of the left and right rails of the chassis.

In certain embodiments, each of the at least one left mounting bracket, and the at least one right mounting bracket include a plurality of rivet holes extending linearly between a front and a back of the battery support.

In certain embodiments, the at least one left mounting bracket includes a lower left mounting bracket attached to a bottom of the battery support and an upper left mounting bracket attached to a top of the battery support. The at least one right mounting bracket includes a lower right mounting bracket attached to the bottom of the battery support and an upper right mounting bracket attached to the top of the battery support.

In certain embodiments, the lower left mounting bracket and the lower right mounting bracket each include at least one gusset.

In certain embodiments, the upper left mounting bracket and the upper right mounting bracket are each devoid of a gusset.

In certain embodiments, each of the lower right mounting bracket and the lower left mounting bracket further comprises a drainage hole in each corner.

According to another aspect of the disclosure, a chassis crossmember assembly includes a chassis crossmember, including a battery support configured to increase a stiffness of a chassis of a vehicle. The battery support consists of a battery tray, including a floor, a front sidewall, and a rear sidewall. The battery tray is configured to extend between a left rail and a right rail of the chassis. The chassis crossmember further includes at least one left mounting bracket configured to rigidly mount a left side of the battery support to a left inner surface of the left rail of the chassis. The chassis crossmember further includes at least one right mounting bracket configured to rigidly mount a right side of the battery support to a right inner surface of the right rail of the chassis. The chassis crossmember assembly further includes at least one vehicle battery installed on the battery support.

In certain embodiments, the chassis crossmember includes a battery hold down, removably fixing the at least one vehicle battery to the battery support.

In certain embodiments, the at least one vehicle battery comprises a first vehicle battery and a second vehicle battery, each of the first vehicle battery and the second vehicle battery having a rectangular shape with two long sidewalls and two short sidewalls. One of the two long sidewalls of the first vehicle battery is positioned adjacent to one of the two long sidewalls of the second vehicle battery.

According to another aspect of the disclosure, a vehicle includes a chassis including a left rail and a right rail. The vehicle further includes a chassis crossmember, including a battery support configured to increase a stiffness of the chassis. The battery support includes a battery tray, including a floor, a front sidewall, and a rear sidewall. The battery tray is configured to extend between the left rail and the right rail of the chassis. The chassis crossmember further includes at least one left mounting bracket configured to rigidly mount a left side of the battery support to a left inner surface of the left rail of the chassis. The chassis crossmember further includes at least one right mounting bracket configured to rigidly mount a right side of the battery support to a right inner surface of the right rail of the chassis. The vehicle further includes at least one vehicle battery installed on the battery support.

In certain embodiments, the chassis crossmember is positioned between a gearbox and a fifth wheel of the vehicle.

In certain embodiments, the chassis crossmember is positioned between a gearbox and a differential of the vehicle.

In certain embodiments, the vehicle further includes an electronic brake system module mounted to the battery support.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary and are intended to provide an overview or framework for understanding the nature and character of the claims. The accompanying drawings are included to provide a further understanding and are incorporated in and constitute a part of this specification. The drawings illustrate one or more embodiment(s), and together with the description, serve to explain the principles and operation of the various embodiments.

BRIEF DESCRIPTION OF THE DRAWINGS

The accompanying drawing figures incorporated in and forming a part of this specification illustrate several aspects of the disclosure, and together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Figure 2:
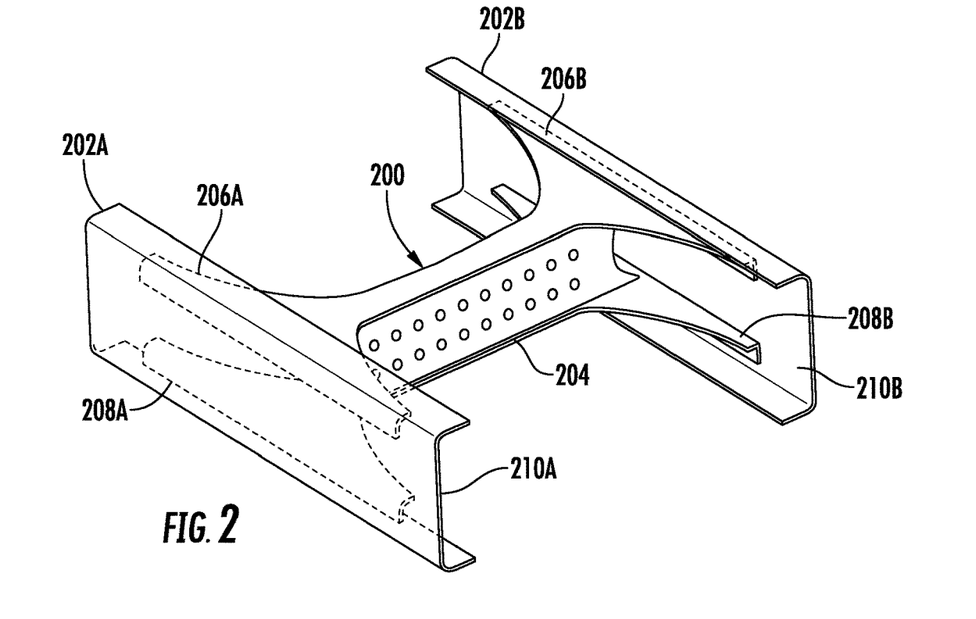
FIG. 2 is a perspective view of a chassis crossmember attached to chassis rails.

FIG. 2 is a perspective view of a chassis crossmember 200 attached to chassis rails 202A, 202B. The chassis crossmember 200 includes a body 204 generally extending perpendicularly between the left chassis rail 202A and the right chassis rail 202B (may be referred to generally as chassis rails 202). Further, the body 204 is rigidly attached to the chassis rails 202 by upper brackets 206A, 206B, and lower brackets 208A, 208B. In particular, left upper bracket 206A and left lower bracket 208A are attached to a left inner surface 210A of the left chassis rail 202A, and right upper bracket 206B and right lower bracket 208B are attached to a right inner surface 210B of the right chassis rail 202B. Accordingly, the chassis crossmember 200 is rigidly attached to the chassis rails 202 to increase a stiffness of a chassis of a vehicle.

Figure 3:
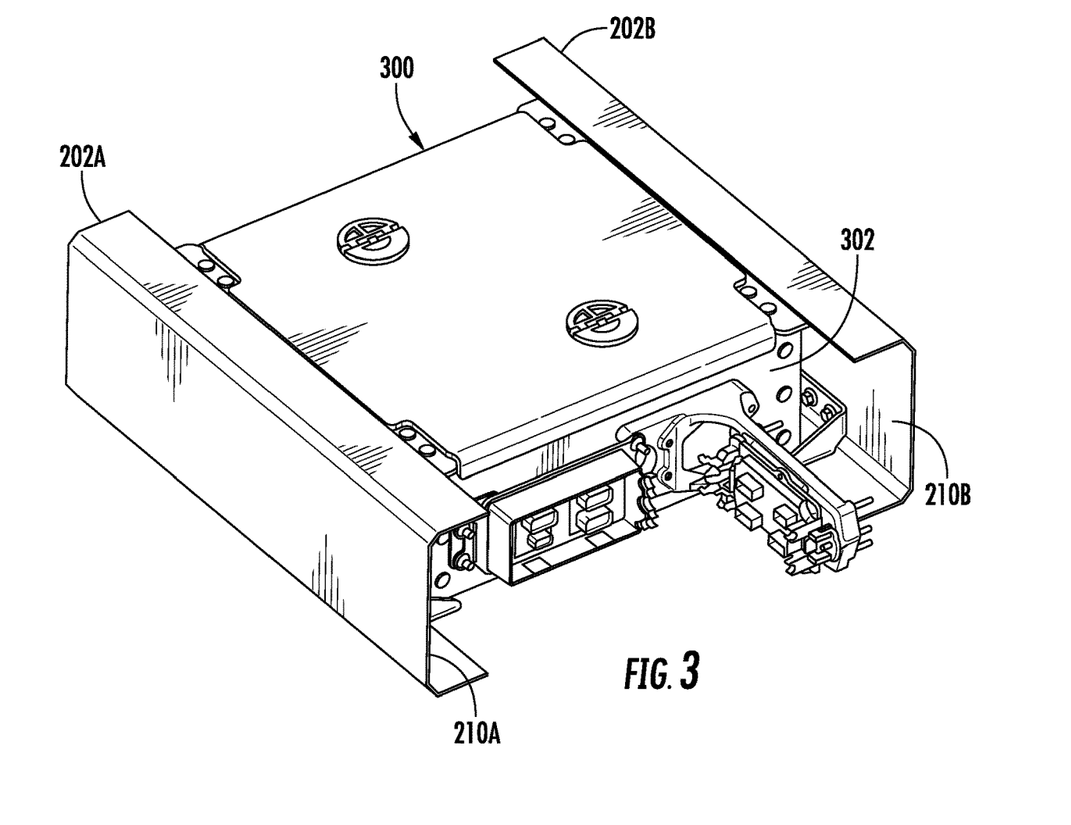
FIG. 3 is a perspective view of a chassis crossmember assembly attached to chassis rails.

FIG. 3 is a perspective view of a chassis crossmember assembly 300 attached to chassis rails 202A, 202B. The chassis crossmember assembly 300 includes a chassis crossmember 302 configured to support a battery and increase a stiffness of a chassis of a vehicle (e.g., truck). The chassis crossmember 302 generally extends perpendicularly between and is rigidly attached to the left chassis rail 202A and the right chassis rail 202B. The chassis crossmember 302 is attached to a left inner surface 210A of the left chassis rail 202A, and the right inner surface 210B of the right chassis rail 202B. Accordingly, the chassis crossmember 302 is rigidly attached to the chassis rails 202 to increase a stiffness of a chassis of a vehicle, while also supporting and/or housing a battery. In certain embodiments, a height of the chassis crossmember 302 is less than a height of the chassis rails 202A, 202B.

Figure 4A:
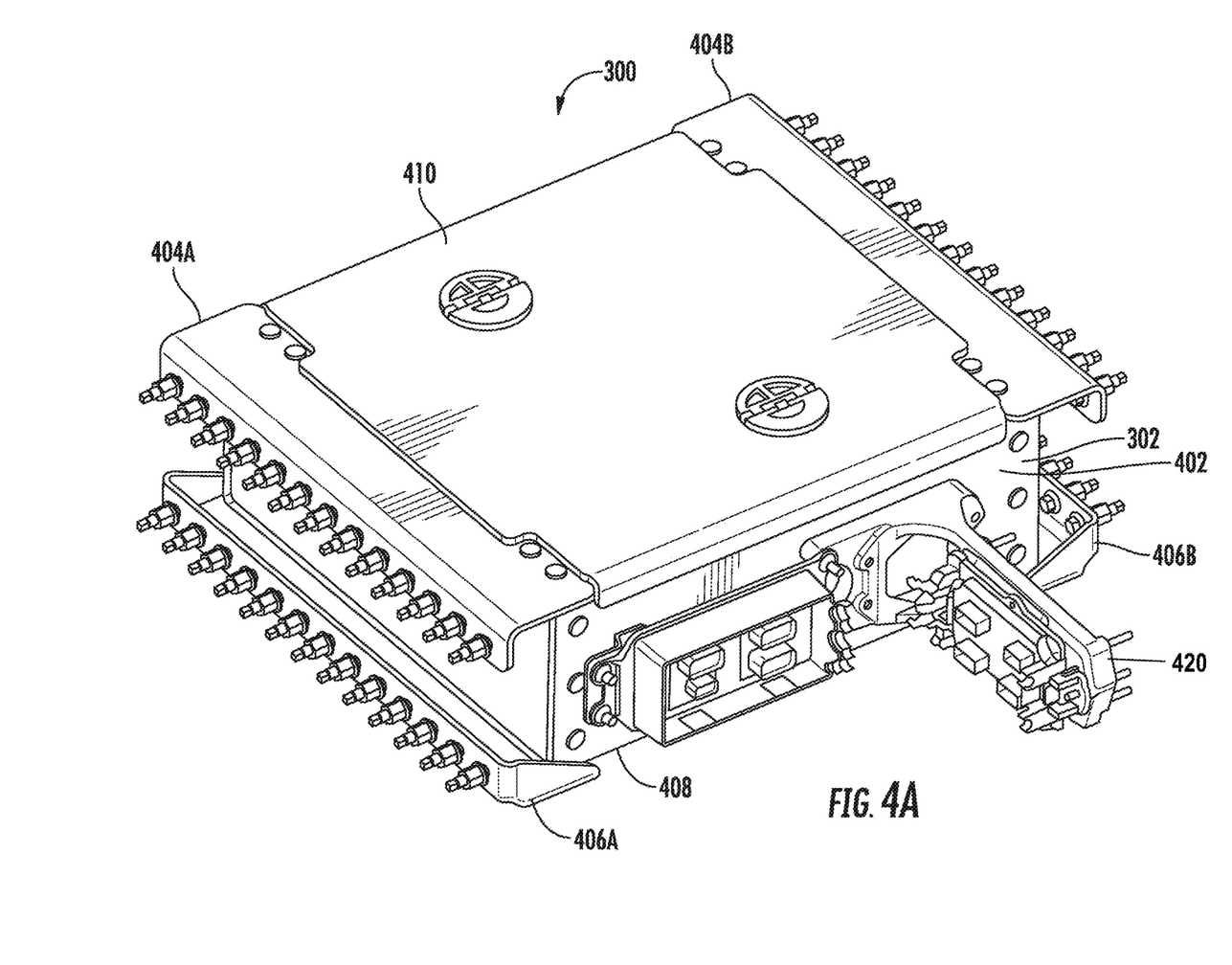
FIG. 4A is a perspective view of the chassis crossmember assembly of FIG. 3.
Figure 4B:
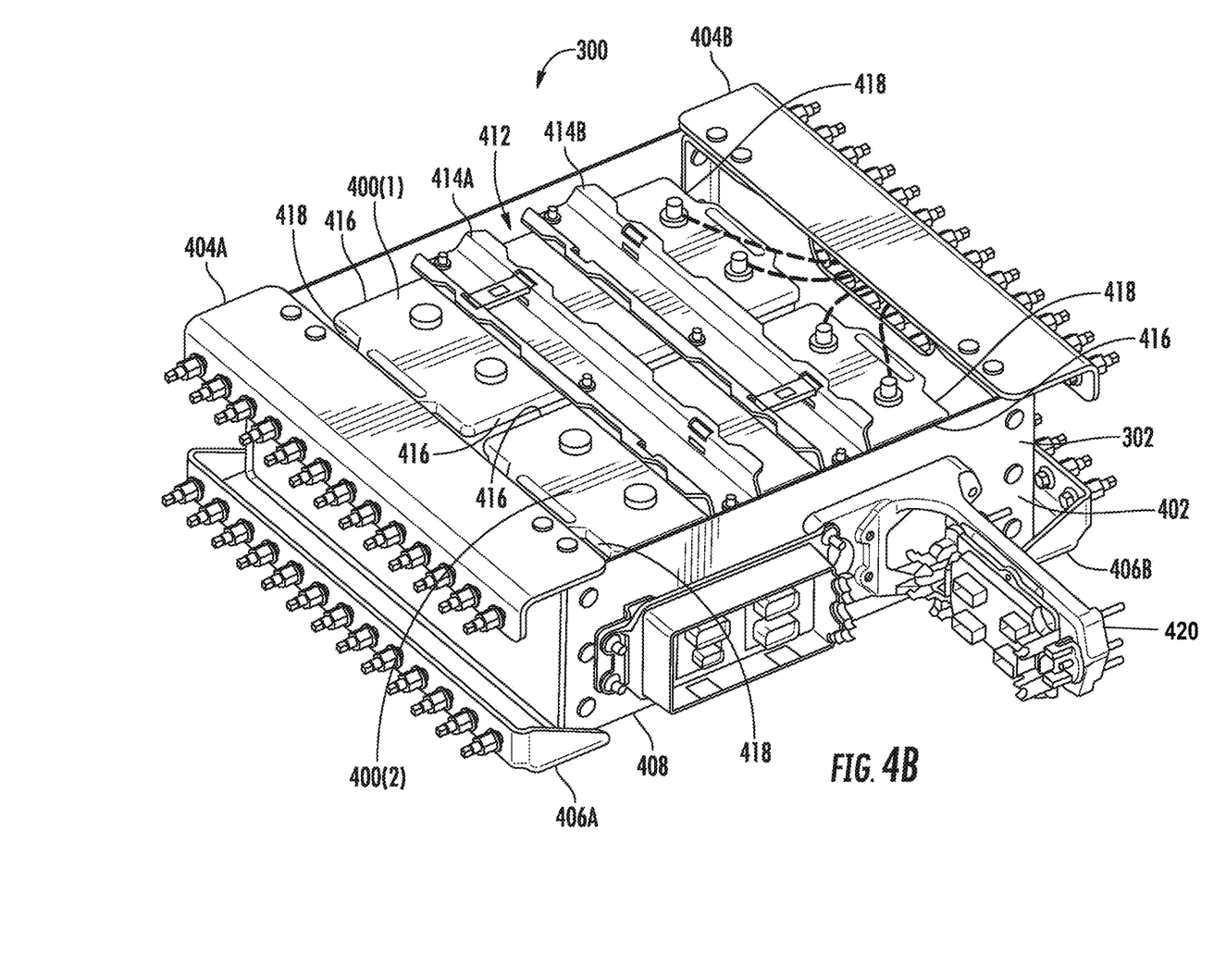
FIG. 4B is a perspective view of the chassis crossmember assembly of FIG. 4A with a cover removed.

FIGS. 4A-4B are views of the chassis crossmember assembly 300 of FIG. 3. The chassis crossmember assembly 300 includes the chassis crossmember 302 and vehicle batteries 400(1), 400(2) (may be referred to as vehicle batteries 400). The chassis crossmember 302 includes a battery support 402 configured to increase a stiffness of a chassis of a vehicle (e.g., truck), and mounting brackets 404A-406B to attach the chassis crossmember 302 to the chassis rails 202. In particular, the chassis crossmember 302 includes an upper left mounting bracket 404A and/or a lower left mounting bracket 406A, which are configured to rigidly mount a left side of the battery support 402 to a left inner surface 210A of the left chassis rail 202A of the chassis. The chassis crossmember 302 further includes an upper right mounting bracket 404B and/or a lower right mounting bracket 406B, configured to rigidly mount a right side of the battery support 402 to a right inner surface 210B of the right chassis rail 202B of the chassis.

In certain embodiments, the battery support 402 includes a battery tray 408 and a steppable cover 410 removably attached to the battery tray 408. The battery tray 408 is configured to extend between a left rail 202A and a right rail 202B of the chassis. The battery tray 408 and steppable cover 410 define an interior 412 with the vehicle batteries 400 mounted and housed therein. In this way, the vehicle batteries 400 are protected from the environment, and the battery support 402 may be stood on by a user without damaging the vehicle batteries 400.

The vehicle batteries 400 include a first vehicle battery 400(1) and a second vehicle battery 400(2), although in certain embodiments, more or fewer vehicle batteries 400 may be used. The vehicle batteries 400 are installed on the battery support 402. In particular, the chassis crossmember 302 includes battery hold downs 414A, 414B removably fixing the vehicle batteries 400 to the battery support 402. Each of the first vehicle battery 400(1) and the second vehicle battery 400(2) have a rectangular shape with two long sidewalls 416 and two short sidewalls 418. One of the two long sidewalls 416 of the first vehicle battery 400(1) is positioned adjacent to one of the two long sidewalls 416 of the second vehicle battery 400(2). The battery hold downs 414A, 414B (between a front and back of the battery support 402) extend across a width of both the vehicle batteries 400.

In certain embodiments, the chassis crossmember assembly 300 includes an electronic brake system (EBS) module 420 mounted to a rear side of the battery support 402. Such a configuration maintains the position of the EBS module 420 relative to the chassis crossmember 200, which facilitates retroactive integration of the chassis crossmember assembly 300 into existing truck configurations. In other embodiments, additional and/or alternative modules may be mounted to the chassis crossmember assembly 300.

Figure 5:
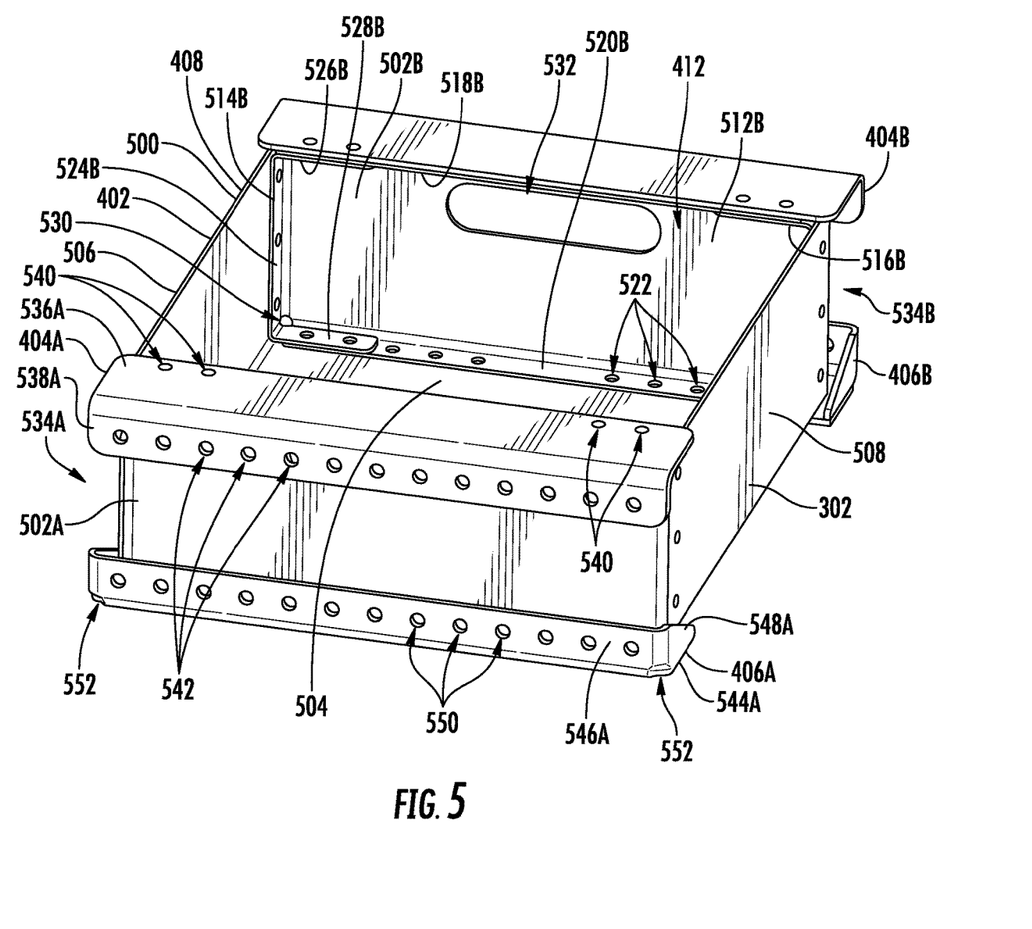
FIG. 5 is a perspective view of the battery tray and mounting brackets of the chassis crossmember assembly of FIG. 4A.

FIG. 5 is a perspective view of the battery tray 408 and mounting brackets 404A-406B of the chassis crossmember assembly 300 of FIG. 4A. The battery tray 408 includes a center portion 500, left side plate 502A, and/or right side plate 502B. The center portion 500 includes a floor 504, a front sidewall 506, and a rear sidewall 508. In certain embodiments, the front sidewall 506, and the rear sidewall 508 are integrally connected to the floor 504. The side plates 502A, 502B (may be referred to generally as side plate 502) extend between the front sidewall 506 and the rear sidewall 508. In certain embodiments, the battery tray 408 includes the center portion 500 but not the side plates 502.

Right side plate 502B includes a plate body 512B with a front flange 514B extending generally perpendicularly from a front edge of the plate body 512B, a rear flange 516B extending generally perpendicularly from a rear edge of the plate body 512B, an upper flange 518B extending generally perpendicularly from an upper edge of the plate body 512B, and/or a lower flange 520B extending generally perpendicularly from a lower edge of the plate body 512B. Each of the flanges 514B, 516B, 518B, 520B, includes a plurality of holes 522 for fastening the right side plate 502B to the center portion 500. The front flange 514B includes a non-overlap portion 524B, an upper overlap portion 526B, and a lower overlap portion 528B. In particular, the lower overlap portion 528B is at a generally perpendicular angle relative to the non-overlap portion 524B. The plate body 512B, non-overlap portion 524B, and lower overlap portion 528B form a drainage hole 530. The overlaps reinforce corners of the battery support 402, thereby providing further strength and rigidity to the battery support 402.

The upper overlap portion 526B includes a similar configuration as the lower overlap portion 528B. Further, the rear flange 516B includes a similar configuration as the front flange 514B. Still, further, the left side plate 502A includes a similar configuration as the right side plate 502B. Accordingly, the battery support 402 includes a drainage hole 530 in each bottom corner of the battery support 402. These drainage holes 530 prevent the accumulation of dust, debris, water, etc. within an interior 412 of the battery support 402.

In certain embodiments, the right side plate 502B includes a cable aperture 532 to route one or more cables from an interior 412 to an exterior of the battery support 402. In particular, one or more cables may be routed from the vehicle batteries 400 within the interior 412 of the battery support 402 to an exterior of the battery support 402.

As noted above, the chassis crossmember assembly 300 includes the upper left mounting bracket 404A and/or a lower left mounting bracket 406A. The lower left mounting bracket 406A, and lower right mounting bracket 406B are attached to a bottom of the battery support 402. The upper left mounting bracket 404A and upper right mounting bracket 404B are attached to a top of the battery support 402.

The upper left mounting bracket 404A is spaced from the lower left mounting bracket 406A to provide a mounting gap 534A therebetween, and the upper right mounting bracket 404B is spaced from the lower right mounting bracket 406B to provide a mounting gap 534B therebetween. These mounting gaps 534A, 534B provides space for other components that may be mounted or positioned at the interior surface or exterior surface of the chassis rails 202.

The upper left mounting bracket 404A includes a horizontal portion 536A and a vertical portion 538A. The horizontal portion 536A includes holes 540 configured to align with holes 522 of the upper left flange 518A and/or overlap portions 526A of the flanges 514A, 516A (e.g., see discussion above of upper right flange 518B). The vertical portion 538A includes a plurality of rivet holes 542 extending linearly between a front and back of the battery support 402 for mounting the upper left mounting bracket 404A to the left chassis rail 202A. In certain embodiments, the vertical portion 538A includes more than ten rivet holes 542 (e.g., thirteen rivet holes 542). Further, the upper left mounting bracket 404A is devoid of a gusset to facilitate assembly of the upper left mounting bracket 404A to the left chassis rail 202A (as discussed in more detail below).

The lower left mounting bracket 406A includes a horizontal portion 544A, a vertical portion 546A, and front and rear gussets 548A therebetween. Similar to the upper left mounting bracket 404A, the horizontal portion 544A includes holes that are configured to align with holes 522 of the lower left flange 520A and/or overlap portions 528A of the flanges 514A, 516A (e.g., see discussion above of upper right flange 518B). The vertical portion 546A includes a plurality of rivet holes 550 extending linearly between a front and back of the battery support 402 for mounting the lower left mounting bracket 406A to the left chassis rail 202A. In certain embodiments, the vertical portion 546A includes more than ten rivet holes 550 (e.g., thirteen rivet holes 550). The lower left mounting bracket 406A includes gussets 548A to increase rigidity and support of the lower left mounting bracket 406A as most of the weight of the battery support 402 is carried by the lower mounting brackets 406A, 406B. Further, in certain embodiments, the lower left mounting bracket 406A includes drainage holes 552 in front and rear corners defined by the horizontal portion 544A, vertical portion 546A, and gusset 548A. These drainage holes 552 prevent the accumulation of dust, debris, water, etc. within the lower left mounting bracket 406A. It is noted that a drainage path is formed from the interior 412 through drainage hole 530 onto the lower mounting bracket 406A and then through drainage hole 552.

The upper right mounting bracket 404B includes a similar configuration as the upper left mounting bracket 404A, and/or the lower right mounting bracket 406B includes a similar configuration as the lower left mounting bracket 406A.

Figure 6A:
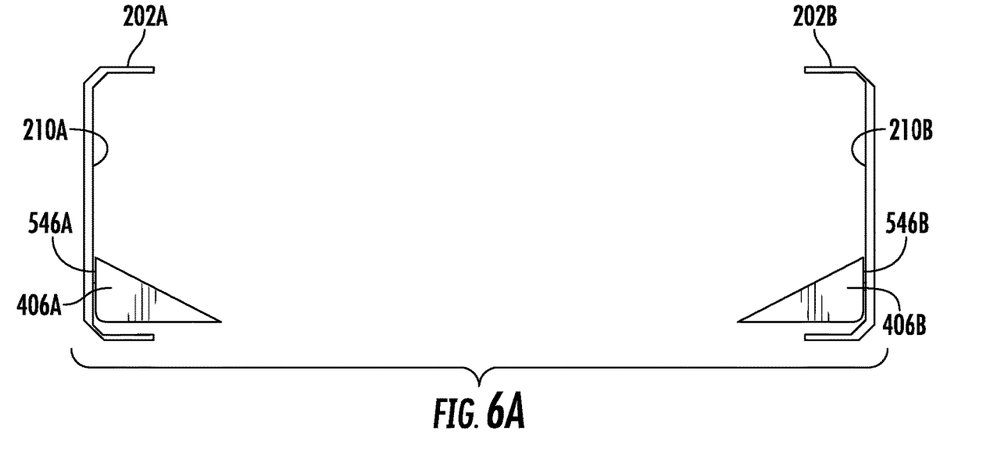
FIG. 6A is a side view of lower mounting brackets of the chassis crossmember assembly of FIG. 4A fixed to chassis rails.
Figure 6B:
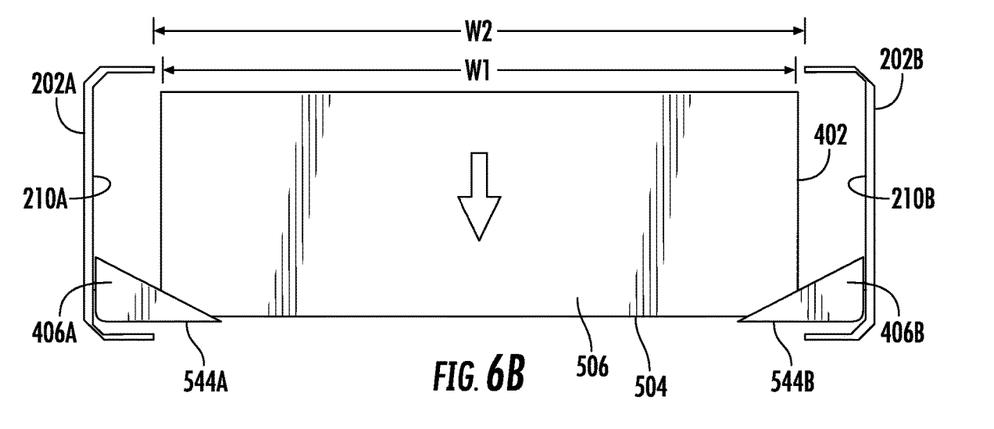
FIG. 6B is a side view of a body of the chassis crossmember assembly of FIG. 4A fixed to the lower mounting brackets.
Figure 6C:
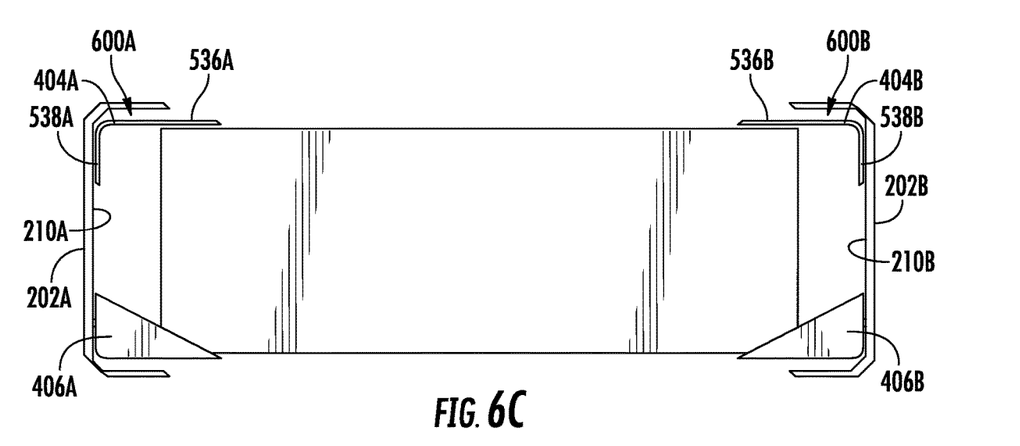
FIG. 6C is a side view of upper mounting brackets of the chassis crossmember assembly of FIG. 4A fixed to chassis rails.

FIGS. 6A-6C are views of mounting the chassis crossmember assembly 300 to chassis rails 202. Referring to FIG. 6A, the left lower mounting bracket 406A, is attached to the left inner surface 210A of the left chassis rail 202A. In particular, the vertical portion 546A of the left lower mounting bracket 406A is attached to the left inner surface 210A. Similarly, the right lower mounting bracket 406B is attached to the right inner surface 210B of the right chassis rail 202B. In particular, the vertical portion 546B of the right lower mounting bracket 406B is attached to the right inner surface 210B.

Referring to FIG. 6B, the battery support 402 is dropped between the chassis rails 202 onto the left and right lower mounting brackets 406A, 406B. In particular, the floor 504 of the center portion 500 of the battery tray 408 of the battery support 402 contacts and is attached to the horizontal portions 544A, 544B of the left and right lower mounting brackets 406A, 406B. In certain embodiments, the width W1 of the battery support 402 is less than a width W2 of a gap between the chassis rails 202 to vertically move the battery support 402 between the chassis rails 202.

Referring to FIG. 6C, left and right upper mounting brackets 404A are attached to the chassis rails 202 and the battery support 402. In particular, the horizontal portion 536A of the left upper mounting bracket 404A is fed between an angled gap 600A (e.g., L-shaped gap) defined between the left chassis rail 202A and the battery support 402. The vertical portion 538A of the left upper mounting bracket 404A is attached to the interior surface 210A of the left chassis rail 202A. The horizontal portion 536A of the left upper mounting bracket 404A is attached to the top of the battery support 402. Similarly, the horizontal portion 536B of the right upper mounting bracket 404B is fed between an angled gap 600B (e.g., L-shaped gap) defined between the right chassis rail 202B and the battery support 402. The vertical portion 538B of the right upper mounting bracket 404B is attached to the interior surface 210B of the right chassis rail 202B. The horizontal portion 536B of the right upper mounting bracket 404B is attached to the top of the battery support 402.

It is noted that the left and right upper mounting brackets 404A, 404B are devoid of gussets, which facilitates positioning of the left and right upper mounting brackets 404A, 404B between the battery support 402 and the chassis rails 202.

Figure 7:
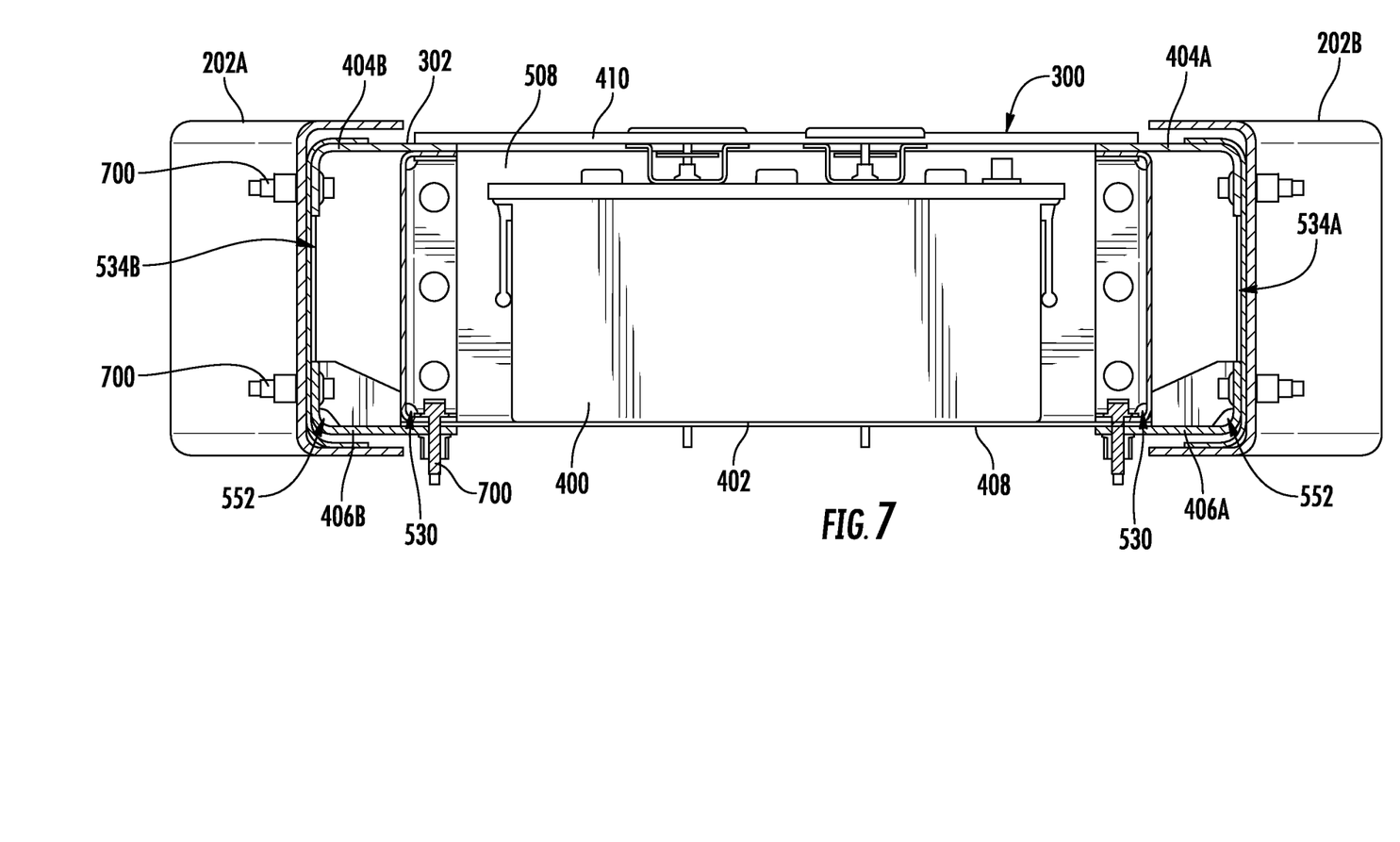
FIG. 7 is a cross-sectional front view of the chassis crossmember assembly of FIG. 4A mounted to chassis rails.

FIG. 7 is a cross-sectional front view of the chassis crossmember assembly 300 of FIG. 4A mounted to chassis rails 202. The chassis crossmember assembly 300 includes a chassis crossmember 302 mounted to chassis rails 202 and vehicle batteries 400 housed within the chassis crossmember 302. In particular, the battery support 402 of the chassis crossmember 302 is mounted to the chassis rails 202 by the mounting brackets 404A-406B and rivets 700 and extends between the left chassis rail 202A and the right chassis rail 202B. The rigid attachment of the battery support 402 to the chassis rails 202 and/or vertical orientation of the front sidewall 506 (see, e.g., FIG. 5) and rear sidewall 508 increases a stiffness of the chassis. As shown, mounting gaps 534A, 534B provide space for other components that may be mounted or positioned at the interior surface or exterior surface of the chassis rails 202.

In certain embodiments, the vehicle batteries 400 are rigidly mounted to and held within the battery support 402. In particular, vehicle batteries 400 are mounted to the battery tray 408 by battery hold downs 414A, 414B and contained within the battery tray 408 by steppable cover 410. Drainage holes 530 prevent the accumulation of dust, debris, water, etc. within an interior of the battery support 402, and/or drainage holes 552 prevent the accumulation of dust, debris, water, etc. within the lower mounting brackets 406A, 406B. In certain embodiments, drainage holes 530, 552 prevent stress concentration in the corners.

Figure 8:
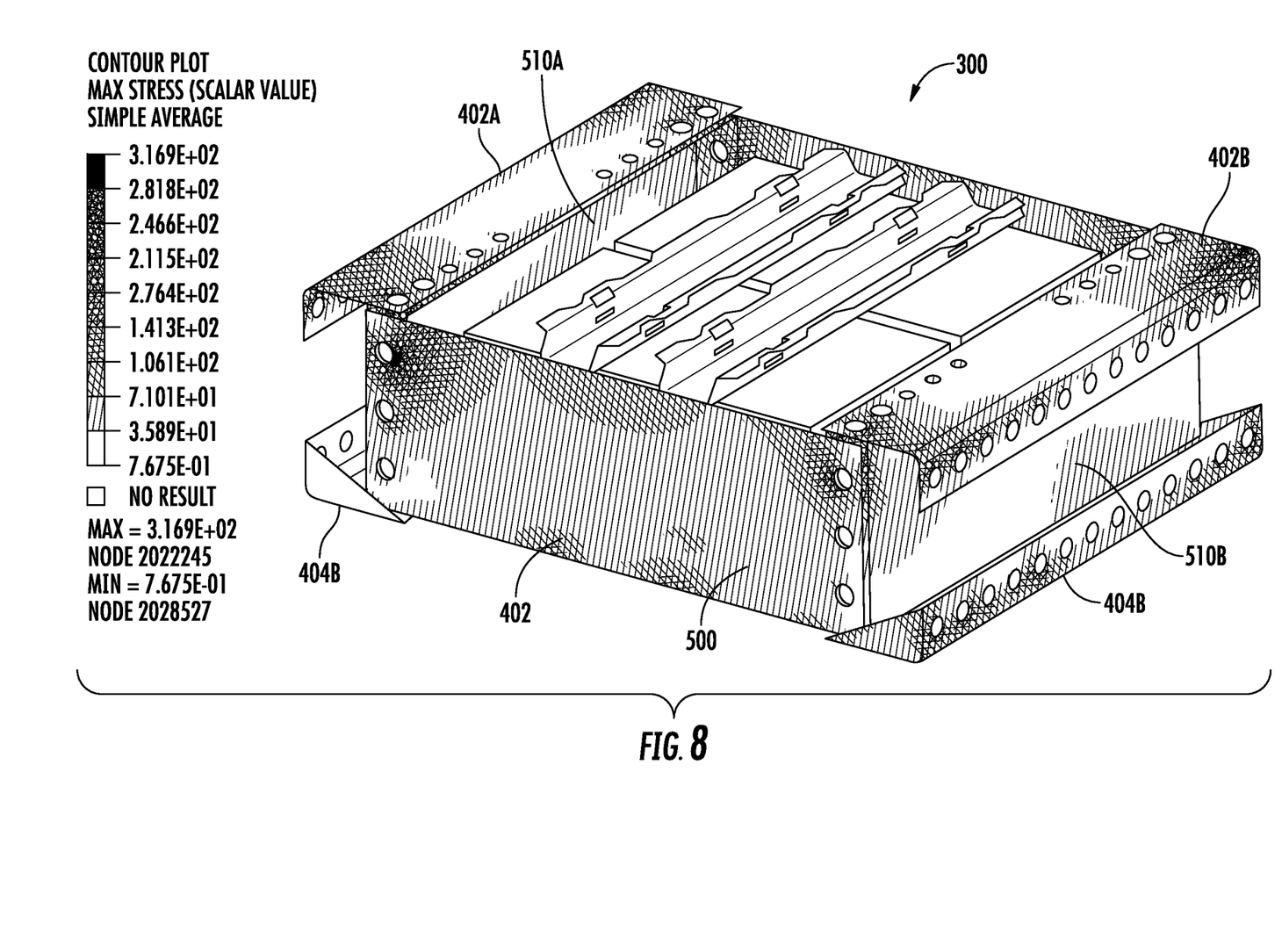
FIG. 8 is a perspective view of a contour plot illustrating maximum stress of the chassis crossmember assembly when subjected to various loads.

FIG. 8 is a perspective view of a contour plot illustrating the maximum stress of the chassis crossmember assembly 300 when subjected to various loads (e.g., torsion, acceleration, etc.) during an endurance test. In certain embodiments, the chassis crossmember assembly 300 is configured for similar stress loads and stiffness as the chassis crossmember 200 (see, e.g., FIG. 2). In certain embodiments, the chassis crossmember assembly 300 is configured for a maximum stress value of 316.9 MPa. In other embodiments, the chassis crossmember assembly 300 is configured for a maximum stress value of 350 MPa. In other embodiments, the chassis crossmember assembly 300 is configured for a maximum stress value of 400 MPa.

In certain embodiments, the battery tray 402 (e.g., center portion 500, left side plate 502A, and/or right side plate 502B include 4 mm, grade 50, 380 MPa yield structural steel. In certain embodiments, the upper mounting brackets 404A, 404B and/or lower mounting brackets 406A, 406B include 7 mm. Grade 70, 500 MPa yield structural steel.

Figure 9:
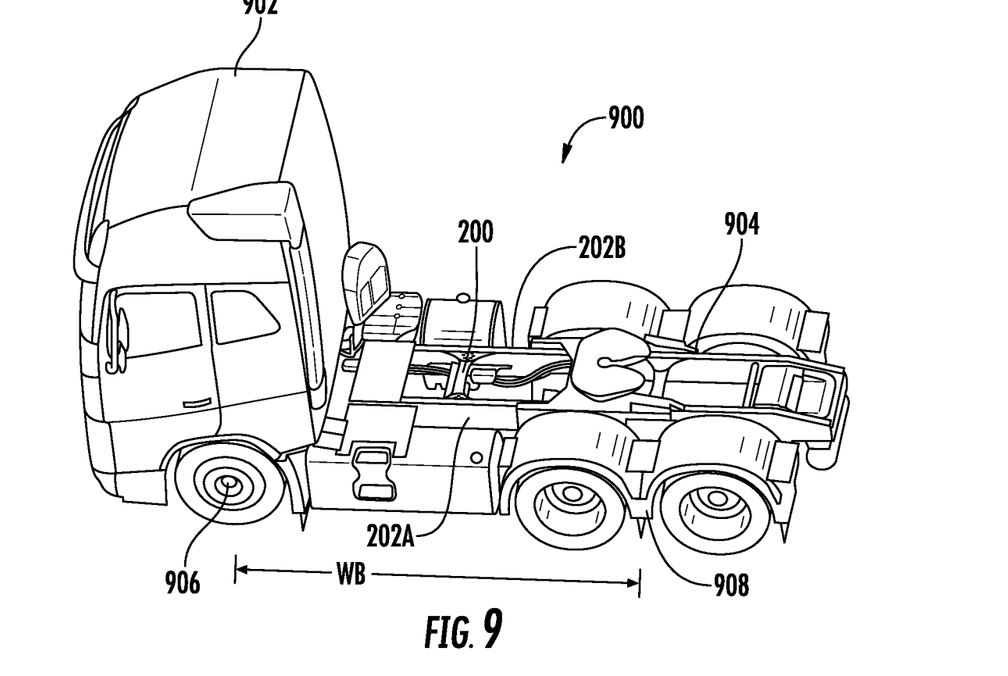
FIG. 9 is a perspective view of a truck with a chassis crossmember attached to chassis rails.

FIG. 9 is a perspective view of a truck 900 with a chassis crossmember 200 attached to chassis rails 202. In particular, the truck 900 includes a cab 902 and a chassis 904. The chassis 904 includes the chassis rails 202 with the chassis crossmember 200 extending therebetween. The truck 900 includes a wheelbase WB defined between the front axle 906 and the center of rear axle hub 908.

Figure 10A:
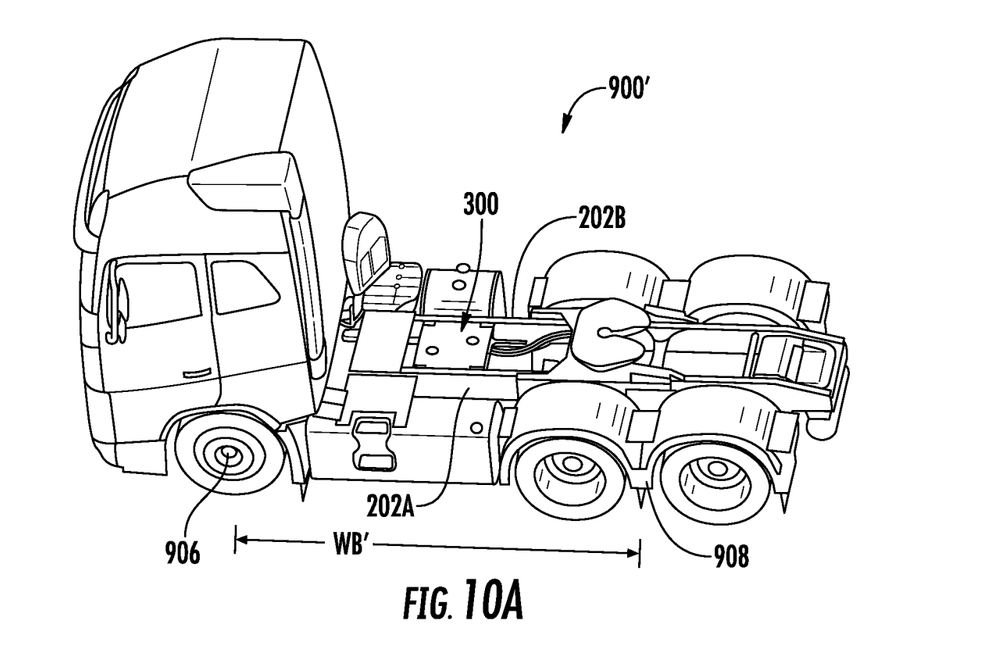
FIG. 10A is a perspective view of a truck with a chassis crossmember assembly with battery support attached to chassis rails.
Figure 10B:
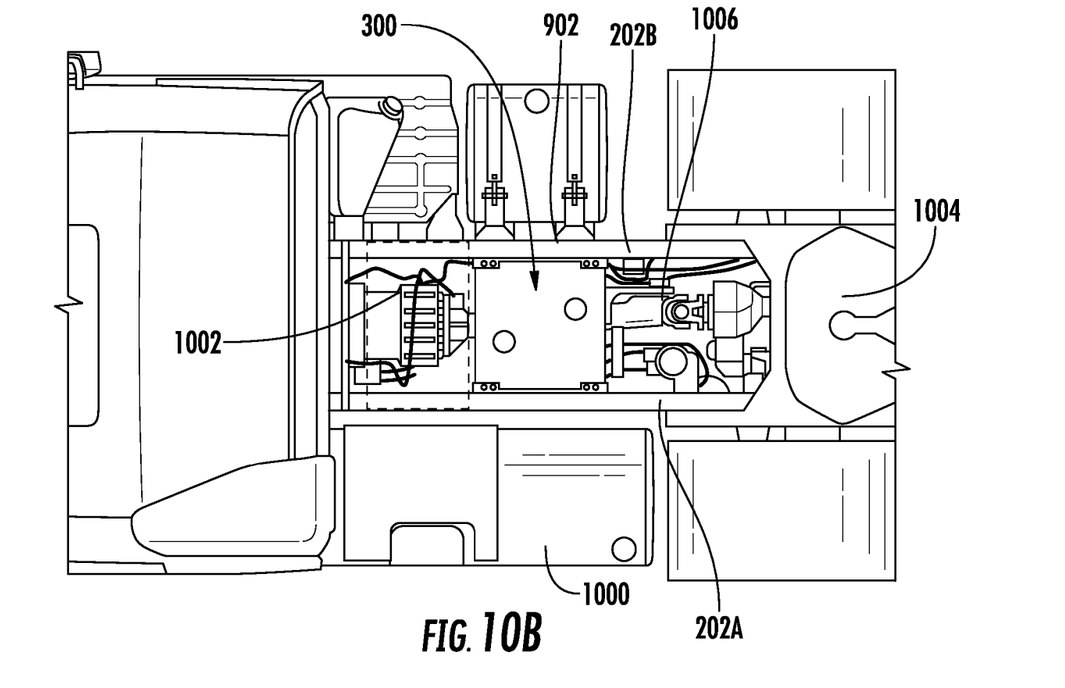
FIG. 10B is a top view of the chassis crossmember assembly of the truck of FIG. 10A.
Figure 10C:
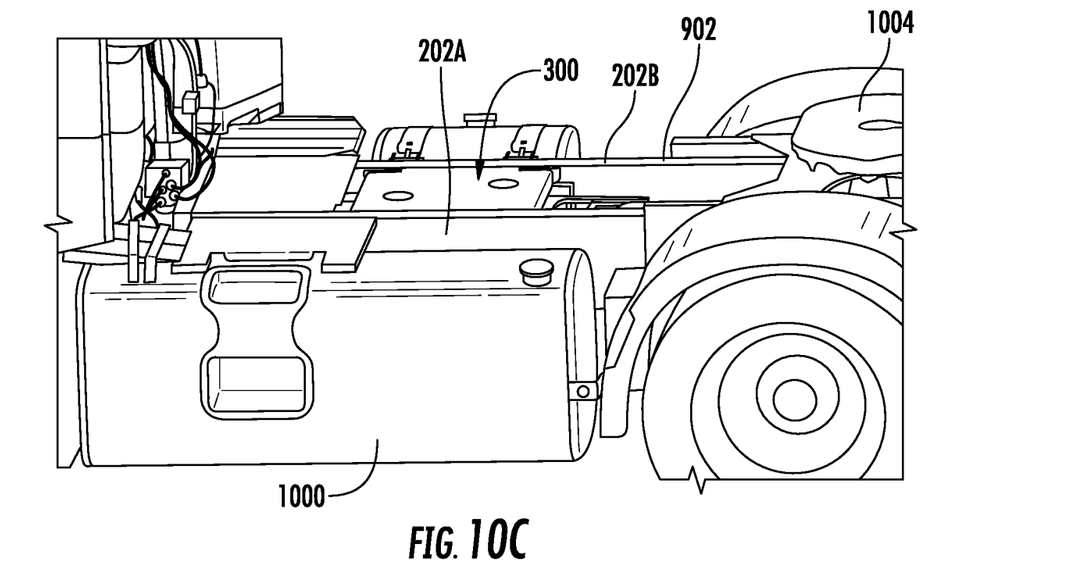
FIG. 10C is a close-up perspective view of the chassis crossmember assembly of the truck of FIG. 10A.

FIGS. 10A-10C are views of a truck 900' with a chassis crossmember assembly 300 with a battery support 402 attached to and extending between the chassis rails 202. Referring to FIG. 10A, as illustrated, the chassis crossmember assembly 300 is configured to replace the chassis crossmember 200. As a result, the wheelbase WB' between the front axle 906 and the center of rear axle hub 908 is reduced relative to the truck 900 of FIG. 9 and without needing to reduce the size of the fuel tank 1000. As noted above, such a configuration reduces the gap between the cab 902 and a trailer (not shown), thereby reducing drag force and/or increasing fuel efficiency. It is noted that although a truck 900' is illustrated, the chassis crossmember assembly 300 may be used in other types of vehicles.

Referring to FIGS. 10B-10C, the chassis crossmember assembly 300 (including the chassis crossmember 302) is positioned between the left chassis rail 202A and the right chassis rail 202B, between a top and bottom of the chassis rails 202, and between a gearbox 1002 and a fifth wheel 1004 of the truck 900'. In certain embodiments, the chassis crossmember assembly (including the chassis crossmember 302) is positioned between the gearbox 1002 and the differential 1006 of the truck 900'. The position of the chassis crossmember assembly 300 is advantageous in reducing accelerations on the vehicle batteries 400, especially compared to the extremities of the chassis 902 (e.g., the front and rear of the chassis 902). For example, accelerations are greater at the back of the truck 900'. Positioning the chassis crossmember assembly 300 in a center of the chassis 902 instead of the rear of the chassis reduces the accelerations on the vehicle batteries 400, which may improve battery performance and/or reduce battery failure. As a result, the chassis crossmember assembly 300 is devoid of cushioning for the vehicle batteries 400, as such cushioning is not required to reduce vibrations and/or accelerations.

It is noted that the EBS module 420 is mounted to the rear sidewall 508 of the battery tray 408 to maintain the EBS module 420 in the same position as that of the truck 900 of FIG. 9. Additional and/or alternative components could also be mounted to the battery tray 408.

Those skilled in the art will recognize improvements and modifications to the preferred embodiments of the present disclosure. All such improvements and modifications are considered within the scope of the concepts disclosed herein and the claims that follow.

What is claimed is:

1. A chassis crossmember, comprising:
 a battery support configured to mount at least one vehicle battery and configured to increase a stiffness of a chassis of a truck, the battery support comprising a battery tray including a floor, a front sidewall, a rear sidewall, and side plates extending between the front sidewall and the rear sidewall, the battery tray configured to extend between a left rail and a right rail of the chassis;
 a lower left mounting bracket and an upper left mounting bracket each configured to rigidly mount a left side of the battery support to a left inner surface of the left rail of the chassis, wherein the lower left mounting bracket is attached to a bottom of the battery support, and the upper left mounting bracket is attached to a top of the battery support;
 a lower right mounting bracket and an upper right mounting bracket each configured to rigidly mount a right side of the battery support to a right inner surface of the right rail of the chassis, wherein the lower right mounting bracket is attached to the bottom of the battery support, and the upper right mounting bracket is attached to a top of the battery support; and
 a steppable cover removably attached to the battery tray, the steppable cover being configured to be accessible in use when the battery support is mounted to the chassis and being configured to be stood on by a user without damaging the at least one vehicle battery when present within the battery tray.

2. The chassis crossmember of claim 1, wherein at least one of the side plates includes a cable aperture to route a cable from an interior to an exterior of the battery support.

3. The chassis crossmember of claim 1, wherein each side plate of the side plates comprises a plurality of flanges that at least partially overlap to reinforce corners of the side plates.

4. The chassis crossmember of claim 1, wherein the battery support further comprises a drainage hole in each corner of the bottom of the battery support.

5. The chassis crossmember of claim 1, wherein the battery support is configured to support two vehicle batteries.

6. The chassis crossmember of claim 1, wherein a height of the chassis crossmember is less than a height of the left and right rails of the chassis.

7. The chassis crossmember of claim 1, wherein the upper left mounting bracket, the lower left mounting bracket, the upper right mounting bracket, and the lower right mounting bracket each include a plurality of rivet holes extending linearly between a front and a back of the battery support; and
 wherein the upper left mounting bracket, the lower left mounting bracket, the upper right mounting bracket, and the lower right mounting bracket each extend along substantially an entire length of the side plates between the front and back of the battery support.

8. The chassis crossmember of claim 1, wherein the lower left mounting bracket, the lower right mounting bracket, the upper left mounting bracket, and the upper right mounting bracket are configured to be at least partially positioned between an outer surface of the battery support and the chassis to rigidly mount the battery support thereto.

9. The chassis crossmember of claim 1, wherein each of the lower right mounting bracket and the lower left mounting bracket further comprises a drainage hole in each corner.

10. The chassis crossmember of claim 1, wherein the lower left mounting bracket and the lower right mounting bracket each include at least one gusset.

11. The chassis crossmember of claim 10, wherein the upper left mounting bracket and the upper right mounting bracket are each devoid of a gusset.

12. A chassis crossmember assembly, comprising:
a chassis crossmember, comprising:
- a battery support configured to increase a stiffness of a chassis of a truck, the battery support comprising a battery tray including a floor, a front sidewall, and a rear sidewall, the battery tray configured to extend between a left rail and a right rail of the chassis;
- a battery hold down removably fixing at least one vehicle battery to the battery support;
- a steppable cover removably attached to the battery tray;
- a lower left mounting bracket and an upper left mounting bracket each configured to rigidly mount a left side of the battery support to a left inner surface of the left rail of the chassis, wherein the lower left mounting bracket is attached to a bottom of the battery support, and the upper left mounting bracket is attached to a top of the battery support; and
- a lower right mounting bracket and an upper right mounting bracket each configured to rigidly mount a right side of the battery support to a right inner surface of the right rail of the chassis, wherein the lower right mounting bracket is attached to the bottom of the battery support, and the upper right mounting bracket is attached to a top of the battery support;

wherein the at least one vehicle battery is installed on the battery support and within the battery tray;

wherein the steppable cover is configured to be accessible in use when the battery support is mounted to the chassis and is configured to be stood on by a user without damaging at least one vehicle battery within the battery tray.

13. The chassis crossmember assembly of claim 12,
wherein the at least one vehicle battery comprises a first vehicle battery and a second vehicle battery, and each vehicle battery of the first vehicle battery and the second vehicle battery has a rectangular shape with two long sidewalls and two short sidewalls; and
wherein one of the two long sidewalls of the first vehicle battery is positioned adjacent to one of the two long sidewalls of the second vehicle battery.

14. The chassis crossmember assembly of claim 12, wherein the lower left mounting bracket, the lower right mounting bracket, the upper left mounting bracket, and the upper right mounting bracket are configured to be at least partially positioned between an outer surface of the battery support and the chassis to rigidly mount the battery support thereto.

15. A truck, comprising:
a chassis comprising a left rail and a right rail;
a chassis crossmember comprising:
- a battery support configured to increase a stiffness of the chassis, the battery support comprising a battery tray including a floor, a front sidewall, and a rear sidewall, the battery tray configured to extend between the left rail and the right rail of the chassis;
- a steppable cover removably attached to the battery tray;
- a lower left mounting bracket and an upper left mounting bracket each configured to rigidly mount a left side of the battery support to a left inner surface of the left rail of the chassis, wherein the lower left mounting bracket is attached to a bottom of the battery support and the upper left mounting bracket is attached to a top of the battery support;
- a lower right mounting bracket and an upper right mounting bracket each configured to rigidly mount a right side of the battery support to a right inner surface of the right rail of the chassis, wherein the lower right mounting bracket is attached to the bottom of the battery support and the upper right mounting bracket is attached to a top of the battery support; and
- at least one vehicle battery installed on the battery support and within the battery tray;

wherein the chassis crossmember is positioned between a gearbox and a differential of the truck; and wherein the steppable cover is configured to be accessible in use when the battery support is mounted to the chassis and is configured to be stood on by a user without damaging the at least one vehicle battery within the battery tray.

16. The truck of claim 15, wherein the chassis crossmember is positioned between the gearbox and a fifth wheel of the truck.

17. The truck of claim 15, further comprising an electronic brake system module mounted to the battery support.

18. The truck of claim 15, wherein the lower left mounting bracket, the lower right mounting bracket, the upper left mounting bracket, and the upper right mounting bracket are configured to be at least partially positioned between an outer surface of the battery support and the chassis to rigidly mount the battery support thereto.

* * * * *